ABSTRACT OF THE DISCLOSURE

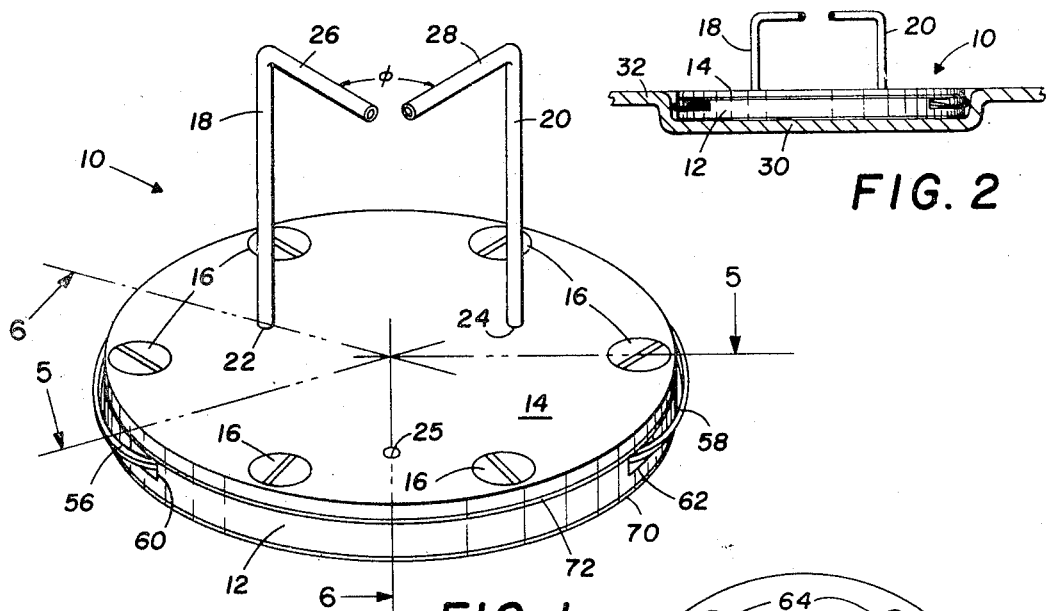
FIG. 2
FIG. 1
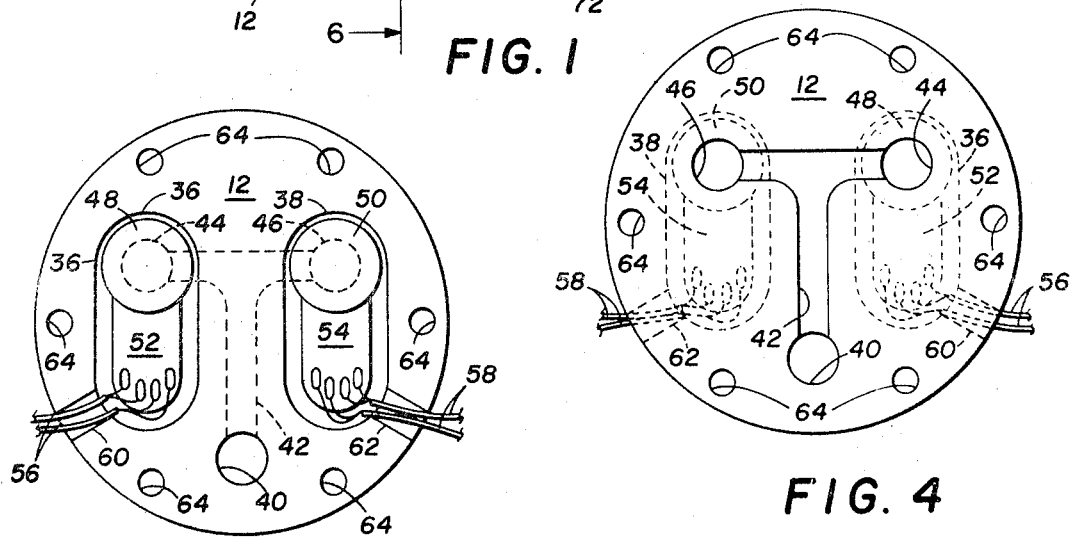
FIG. 3
FIG. 4
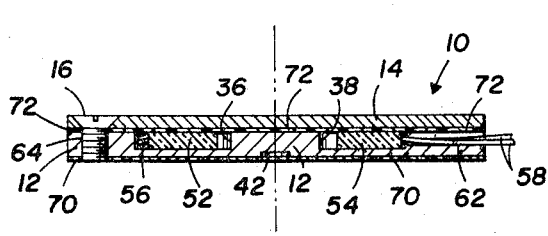
FIG. 5
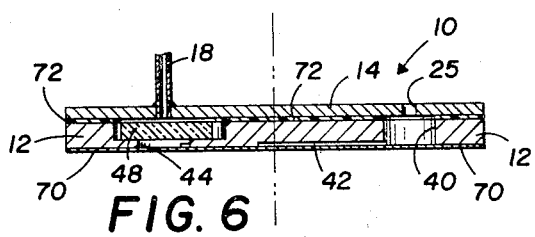
FIG. 6
INVENTORS:
WATSON H. TANNER
ROBERT M. WOHLFELD
ATTORNEYS 3,520,184
DIRECTIONAL PRESSURE PROBE
Watson H. Tanner, Hurst, and Robert M. Wohlfeld,
Dallas, Tex., assignors to Bell Aerospace Corporation, Hurst, Tex., a corporation of Delaware
Filed Nov. 21, 1968, Ser. No. 777,669
Int. Cl. G01p 5/00
U.S. Cl. 73—182      12 Claims

The disclosure relates to a directional pressure probe for use on aircraft or the like which includes a cylindrical plate having a pair of bays open to one surface thereof. A bore is provided through the plate, with channels communicating with the bays and the bore. A cover plate covers the surface of the cylindrical plate and includes three apertures which extend into communication with the bays and the bore. A pair of Pitot tubes extend outwardly from the two apertures which communicate with the bays, each of the Pitot tubes terminating in a generally right-angled bend portion which extends at an angle toward the other tube. Pressure sensitive transducers are disposed in each bay to provide indications of the difference between static pressure sensed through the bore and the channels and directional pressures sensed through the Pitot tubes.

FIELD OF THE INVENTION

This invention relates to pressure sensing systems, and more particularly to a directional pressure probe system for use on aircraft or the like.

THE PRIOR ART

It is necessary to provide accurate indications of air pressure for the operation of helicopters and other aircraft. Previously developed pressure sensing systems for aircraft have utilized such devices as Pitot tubes for obtaining indications of directional components of the dynamic air pressure and receiving ports for obtaining indications of the static air pressure. From these indications, such information as the true air speed of the aircraft along a preselected axis have been computed.

Such previously developed pressure sensing systems have not, however, been completely satisfactory due to the fact that they often protrude so far from the surface of the aircraft that they induce severe drag and otherwise inhibit the performance of the aircraft. Moreover, many of the previous systems have not only been difficult and expensive to manufacture and install, but have not provided sufficiently accurate indications of true static pressure or of directional components of dynamic pressure. Additionally, previously developed pressure sensing systems have often not had a high frequency response which is sufficient to provide generally instantaneous velocity measurements of pressures in an operating aircraft.

SUMMARY OF THE INVENTION

In accordance with the present invention, a pair of Pitot tubes extend outwardly from a plate flush with the surface of an aircraft, the tubes having open-ended bend portions which extend toward one another at an angle in the same general plane. Transducers are disposed below the Pitot tubes for receiving directional components of pressure on first pressure sensitive surfaces. Conduit means is provided to direct indications of static pressure against opposite second pressure sensitive surfaces of the transducers.

In a more specific aspect of the invention, a generally cylindrical plate has a pair of bays defined therein which are open to an outer surface. A bore extends through the plate, with channels communicating with the bays and the bore. A cover is attached over the surface of the plate and includes apertures extending therethrough for communication with the bays and the bore. A pair of Pitot tubes extend outwardly from the apertures, the tubes terminating in generally right-angled bend portions extending at an angle toward one another. Differential pressure sensitive transducers are disposed in each bay for receiving indications of pressure from the Pitot tubes and from the bore and channels.

THE DRAWINGS

For a more complete understanding of the present invention and for further objects and advantages thereof, reference is now made to the following description taken in conjunction with the accompanying drawings, in which:

FIG. 1 illustrates a perspective view of the assembled pressure probe system;

FIG. 2 illustrates a side view of the pressure probe system shown positioned in a flat dimple within an aircraft surface;

FIG. 3 is a top view of the main body of the assembled pressure probe system shown in FIG. 1;

FIG. 4 is a bottom view of the body shown in FIG. 3;

FIG. 5 is a sectional view taken generally along the section lines 5—5 of FIG. 1; and FIG. 6 is a sectional view taken generally along the section lines 6—6 of the system shown in FIG. 1.

DESCRIPTION OF THE PREFERRED EMBODIMENT

Referring to FIG. 1, the present pressure probe system is designated generally by the numeral 10. The system comprises a relatively thin, body or cylindrical plate 12 with a cover plate 14 attached thereto by suitable screws 16. A pair of tube members or Pitot tubes 18 and 20 extend from a pair of apertures 22 and 24 which extend through the cover plate 14. A port or aperture 25 extends through the cover plate 14 for the admission of static pressure into the device. The Pitot tubes include right-angle bend portions 26 and 28 which are open ended and which extend toward one another in the same plane at an angle $\phi$, which is preferably about 90°.

FIG. 2 illustrates the installation of the pressure probe system 10 in a shallow depression 30 within the surface of an aircraft. For instance, the depression 30 may be provided within the blade of a helicopter or in the fixed wing of a conventional aircraft. An important aspect of the invention is the fact that the upper surface of the plate 14 is set flush with the surface 32 of the aircraft, thereby eliminating substantial drag on the aircraft. The probe system 10 may be attached within the depression 30 by extending the ends of the screws 16 into suitable holes within the surface of the aircraft.

FIG. 3 illustrates a top view of the cylindrical plate 12. A pair of oval-shaped bays, or recesses, 36 and 38 are contained within the upper surface of the plate 12. A bore 40 extends completely through the plate 12 and communicates via a generally T-shaped channel 42 with apertures 44 and 46. As shown in FIG. 4, apertures 44 and 46 communicate with the bays 36 and 38 through the lower side of the plate 12.

Pressure sensitive means comprising a pair of differential pressure transducers 48 and 50 are disposed within the bays 36 and 38. The transducers include terminal portions 52 and 54 to which are connected output wires 56 and 58. Wires 56 and 58 run through channels 60 and 62 which extend from the bays 36 and 38 to the exterior of the plate 12. A number of apertures 64 are defined about the periphery of the plate 12 for receiving the screws 16.

FIG. 5 illustrates a sectional view of the assembled pressure probe system 10 taken generally along the section lines 5—5 in the system shown in FIG. 1. A bottom cover plate 70 is attached to the bottom of the plate 12 by the screws 16 in order to pressure seal the bottom of the system 10. A gasket plate 72 is disposed between the cylindrical plate 12 and the cover plate 14 in order to provide a pressure seal therebetween. The gasket plate 72 is provided with three holes to mate with the apertures 22, 24 and 25. As shown in the sectional view of FIG. 6, pressure is applied through the Pitot tube 18 and through the gasket plate 72 to an upper surface of transducer 48. Static pressure is applied through the port 25 and through the bore 40 and channel 42 to the underside of the transducer 48 via the aperture 44. Differential pressures are applied to the opposite sides of the transducer 50 in a like manner.

In a preferred embodiment, the Pitot tubes 18 and 20 are provided with relatively sharp 90° bends and with relatively small diameters. For instance, a practical embodiment utilized Pitot tubes having outer diameters of about 0.03 inch and a wall thickness of about 0.008 inch. The length of the bend portions 26 and 28 may be varied according to a desired particular use, but preferably is of a length of at least 4–5 outer diameters of the Pitot tubes. The length of the vertically extending portions of the Pitot tubes can also be varied, but should extend above the surface of the plate 14 by at least one outer diameter of the Pitot tubes. As previously noted, the bend portions 26 and 28 preferably extend at about 90° to one another, with the open ends of the tubes being spaced apart by at least 3 to 4 outer diameters of the tubes to avoid velocity speedup. The Pitot tubes are preferably constructed from a metal, such as stainless steel or the like, which has sufficient strength to withstand the high fluid pressures which occur during operation in an aircraft.

The pressure transducers 48 and 50 are of the type which have opposite surfaces each responsive to a different pressure to provide differential output indications. These transducers may, for instance, comprise opposed diaphragms which are bonded to foil strain gages contained within the transducers. In some instances, it may be desirable to utilize a pair of transducers each having a single pressure sensitive surface in a back-to-back relationship.

A suitable transducer for use with the present invention is the subminiature pressure transducer manufactured and sold under the trade name M-7 F Type by Scientific Advances, Inc., of 1400 Holly Ave., Columbus, Ohio. These subminiature transducers are particularly advantageous for use with the present invention because of their small thickness and excellent output characteristics over wide ranges of environmental parameters. The transducers are generally affixed within the bays 36 and 38 by a suitable epoxy cement or the like.

The operation of the present system will be generally apparent from the foregoing description. The bend portions 26 and 28 of the Pitot tubes 18 and 20 are directed toward the direction of movement of the aircraft so that the open ends of the tubes receive directional air pressure components. These directional pressure components are fed through the tubes and through the apertures 22 and 24 to the upper surfaces of the transducers 48 and 50 within the bays 36 and 38. The static pressure about the aircraft is applied through the port 25 and through the bore 40 and T-shaped channel 42 to the underside of the transducers 48 and 50 via apertures 44 and 46. Thus, the transducers 48 and 50 generate electrical signals indicative of the differential pressures applied to the opposite surfaces thereof. These electrical signals are utilized in a bridge circuit configuration (not shown) to provide indications of the direction and magnitude of the pressure about the aircraft.

Whereas the present invention has been described in respect to a specific embodiment thereof, it will be understood that various changes and modifications will be suggested to one skilled in the art, and such changes and modifications are to be encompassed which fall within the true scope of the appended claims.

What is claimed is:

1. A directional pressure probe for a vehicle comprising:
   (a) a pair of Pitot tubes extending outwardly from the surface of the vehicle and having open ends extending toward one another at an angle and in a plane parallel to said surface,
   (b) transducers having first and second differential pressure sensitive surfaces adjacent said Pitot tubes for receiving directional components of pressure adjacent to said surface, and
   (c) conduit means for applying ambient static pressure to said second surfaces of said transducers.

2. The pressure probe of claim 1 wherein said open ends extend generally perpendicularly toward one another.

3. The pressure probe of claim 1 and further comprising:
   a body having two recesses open to an outer surface and a bore therethrough for receiving static pressure,
   said conduit means communicating with said recesses and said bore,
   said transducers disposed within said recesses, and
   a plate disposed over said body and supporting said Pitot tubes for communication with said recesses.

4. The pressure probe of claim 3 wherein said conduit means comprises channels formed in a surface of said body opposite said recesses.

5. The pressure probe of claim 3 wherein said body is generally circular and is disposed within a cavity in the vehicle surface.

6. A directional pressure probe comprising:
   (a) a body having a pair of bays therein open to an outer surface and a bore therethrough with channels communicating with said bays and said bore,
   (b) a plate covering said surface of said body with apertures extending therethrough for communication with said bays and said bore,
   (c) a pair of tube members extending outwardly from two of said apertures and each terminating in a bend portion extending at an angle to one another, and
   (d) pressure sensitive means disposed in each said bay.

7. The directional pressure probe of claim 6 wherein said bays and said channels are formed on opposite sides of said body.

8. The directional pressure probe of claim 6 wherein said bend portions of said tube members are right angle bends and extend generally perpendicularly toward each other.

9. The directional pressure probe of claim 6 wherein said body has a generally cylindrical configuration and is adapted to be disposed in a flat recess within an aircraft.

10. The directional pressure probe of claim 6 wherein said bays have a generally oval configuration and said channels have a generally T-shaped configuration, said bays and channels being formed on opposite sides of said body.

11. The directional pressure probe of claim 6 wherein said pressure sensitive means comprises:
   a thin transducer having opposite differential pressure sensitive surfaces, directional pressure components being directed through said tube members to one of said surfaces and static pressure being directed through said bore and said channels against the other of said surfaces.

12. The directional pressure probe of claim 11 wherein said transducer generates electrical signals indicative of the differential pressures applied to said surfaces.

References Cited

UNITED STATES PATENTS 3,273,399  9/1966  Saltzman et al. ___ 73—212 XR

FOREIGN PATENTS 932,284  11/1947  France.

DONALD O. WOODIEL, Primary Examiner

U.S. Cl. X.R.

73—212